June 1, 1937.  A. LEIB ET AL  2,082,347

RADIO DIRECTION SYSTEM

Filed Nov. 28, 1933  4 Sheets—Sheet 1

INVENTORS.
AUGUST LEIB
HANS SCARLAU.
BY  J. H. S. Grover
ATTORNEY

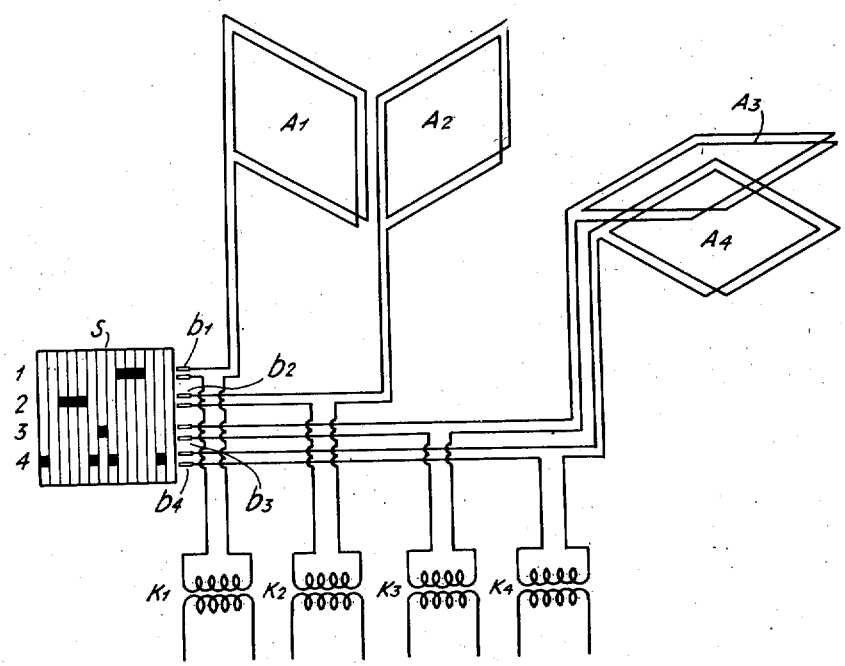
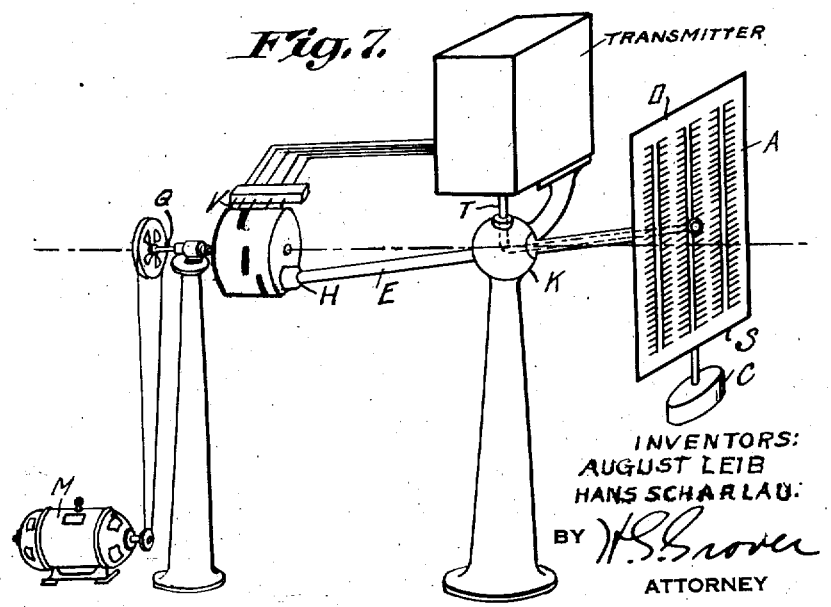

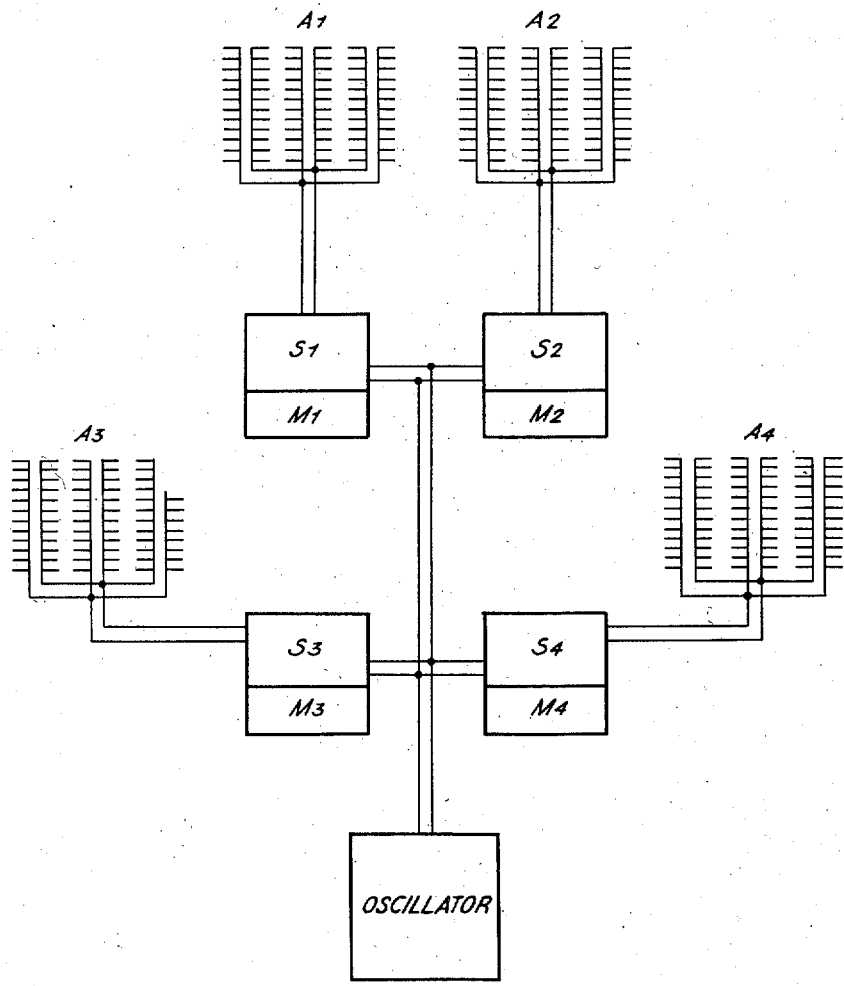

June 1, 1937.                    A. LEIB ET AL                    2,082,347
                            RADIO DIRECTION SYSTEM
                    Filed Nov. 28, 1933        4 Sheets—Sheet 4

INVENTORS
AUGUST LEIB
HANS SCHARLAU
BY
ATTORNEY

Patented June 1, 1937

2,082,347

UNITED STATES PATENT OFFICE 2,082,347

RADIO DIRECTION SYSTEM

August Leib and Hans Scharlau, Berlin, Germany, assignors to Telefunken Gesellschaft für Drahtlose Telegraphie m. b. H., Berlin, Germany, a corporation of Germany Application November 28, 1933, Serial No. 700,067
In Germany November 29, 1932

4 Claims. (Cl. 250—11)

This invention relates to a system for the direction of airplanes along a line.

It is well known in order to direct sea or aircrafts, to emit two electro-magnetic radiations of different spacial distribution from a definite position in such manner that the geometrical location in space of all points where the reception of both radiations is of equal intensity, forms a direction zone for the craft. Both radiations have hereby different characteristic markings such as different Morse signals or modulations so that the pilot is enabled of ascertaining through comparison of the receiving intensities with different indications by means of acoustic or optical indicators whether he travels at the right or left side of the direction zone. This (so-called Scheller-Kiebitz) direction method, however, is insufficient in order to direct an aircraft moving within three dimensions of space (in other words an airplane) along a definite line; on the other hand it is often desirable to avail oneself of such line of direction such as a line inclined towards the field of landing under a very small angle and which may serve as landing course.

Figure 1:
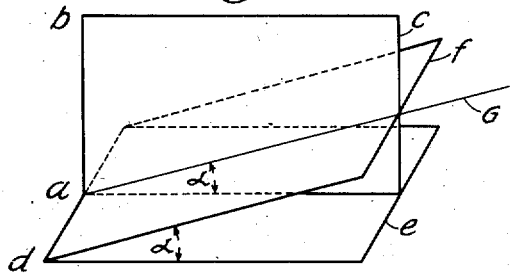
Figure 4:
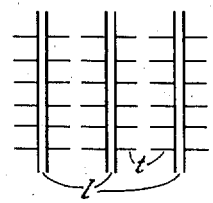
Figure 2:
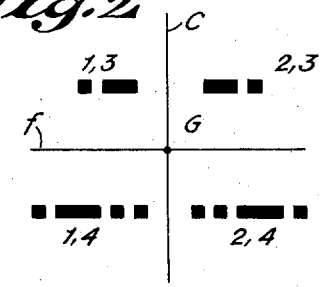
Figure 2A:
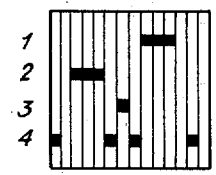
Figure 2B:
Figure 3:
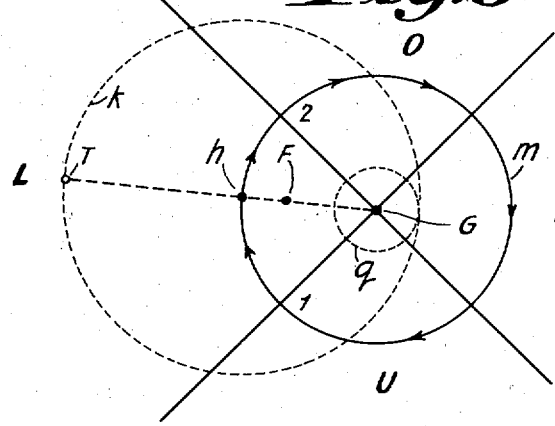
Figure 3A:
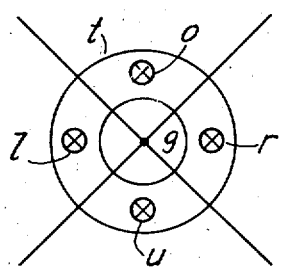
Figure 5A:
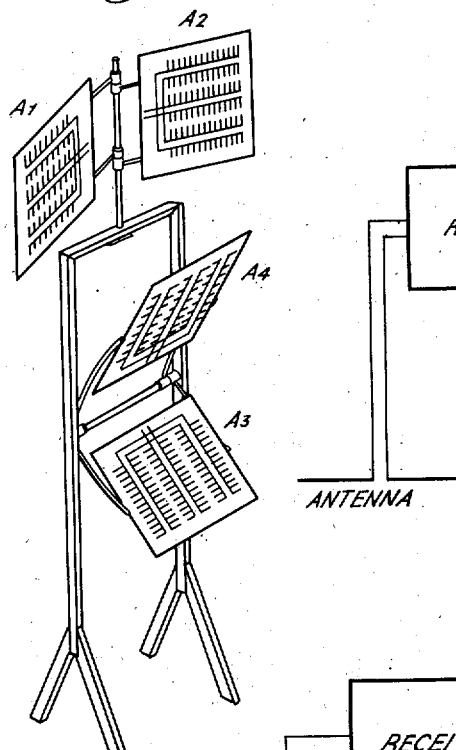
Figure 6:
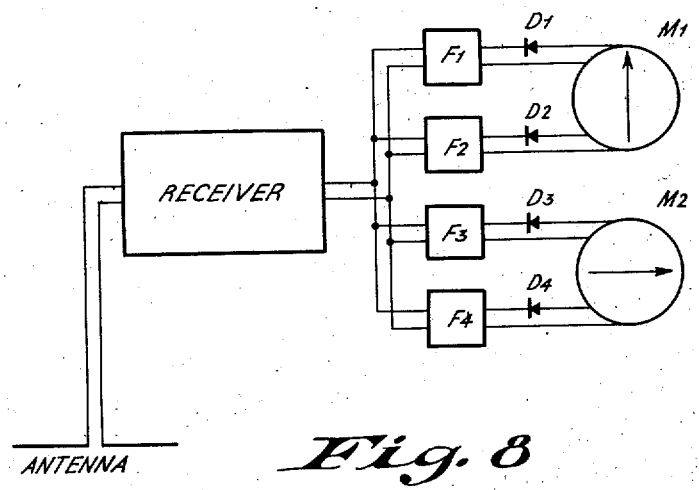
Figure 8:
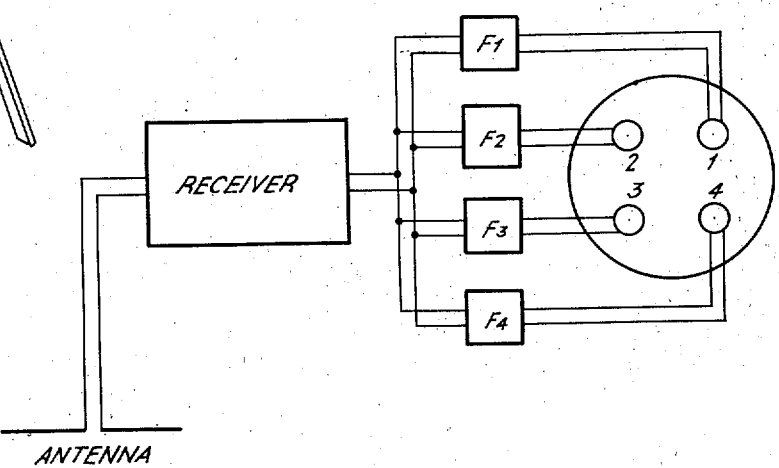

This invention will best be understood by referring to the accompanying drawings in which Figure 1 shows, diagrammatically, two vertical frame radiators having intersecting planes; Figure 2 shows the arrangement of different Morse signals on the radiation sectors; Figure 2a shows the arrangement of a rotating switch drum in the developed state which controls the Morse signals; Figure 2b shows an uninterrupted row of Morse signals resulting from the cooperation of all rows of the segments of the rotating switch drum; Figure 2c is a circuit diagram showing how the frame radiators are connected to the rotating switch drum; Figure 3 is a diagram of a radiating sector oriented in space; Figure 3a is a diagram of the lamp indicator for indicating the radiating sectors; Figure 4 is a diagram of a single beam antenna unit; Figure 5 is a diagram showing the arrangement of the four beam antennas; Figure 5a is a perspective view of the arrangement of the four beam antennas; Figure 6 is a diagram of the receiver circuit arrangement; Figure 7 is a perspective view of a transmitter having a single beam antenna; and Figure 8 is a diagram of the receiver arrangement employing four optical indicators.

In accordance with this invention a directing line oriented in space at any desired angle, can be established in that a greater number than two radiation sectors emitted from approximately the same point, are produced at equal wave length and which are distinguishable by means of different indications and define, within their common zone of superposition, as directing line, the location of the points at which all radiation sectors or always two sectors within each pair produce equal receiving intensity. It is possible for instance (see Fig. 1) by means of two vertical frame radiators whose planes intersect along the vertical line $a$—$b$, to establish in a known manner a vertical directing plane $c$ as the plane of equal field intensity of the two frame radiations, and to produce in a similar manner by means of two further frame radiators crossing each other along the horizontal line $a$—$d$, a second directing plane $f$ as location of the equal intensity of the second radiation pair and which is inclined at an angle $\alpha$ against the horizontal plane $e$. The two directing planes $c$ and $f'$ intersect in line G which may serve as directing line. In order to control the deviation of the aircraft from this directing line, its receiver can be provided with two optical indicators known as such. In modulating for instance the radiation producing the directing plane $c$ by means of two audio-frequencies $n_c$ and $n_c'$, at the out-put of the receiver, the energies corresponding to the two modulations can be separated by the use of suitably tuned filters whereafter they can be differentially supplied to an A. C. instrument, or to a D. C. instrument after rectification and in such a manner that at equal receiving intensity (i. e., when the aircraft travels in the directing plane) the pointer of the indicator remains in its central position while at a deviation of the aircraft towards the left or right side of this plane, the pointer moves correspondingly towards the left or the right. In like manner a second indicator, differentially controlled by energies with modulating frequencies $n_f$ and $n_f'$ respectively, can be provided for the directing plane $f$ preferably with a pointer moving relative to a vertical scale whereby its deviations from the middle position upwards or downwards indicate that the aircraft travels above or below the directing plane $f$.

It is obvious that instead of frame radiators, also other radiators with a more distinct directional effect, can be used, such as di-poles with parabolic reflectors or other known radiators with sharp concentration. It is only essential that the radiating beams are formed in such manner that all of them or always two of them within each pair produce the same receiving intensity in the directing line.

It is also possible to render the radiation sectors distinguishable from each other in the known manner by means of different Morse signals instead of different modulations. It may be assumed for instance (see Fig. 2) that two radiations $s_1$ and $s_2$ produce a directing plane $c$ (represented in Figure 2 by the intersection line of this plane with the drawing plane directed at right angles to the direction of propagation of the radiation) and that the other two radiations $s_3$ and $s_4$ produce the other directing plane represented by the intersection line $f$ with the plane of the drawing, and that the four radiations are controlled by means of a rotating switch drum shown in Figure 2a in the developed state, namely, the radiations $s_1$, $s_2$, $s_3$, $s_4$ by means of the respective rows of segments 1, 2, 3, 4 respectively. In this case the sequence and the duration of the single signals of different radiations is determined by the length and the disposition of the contact segments in a clearly distinguishable manner. If the airplane resides in a lateral position with respect to the directing line G within the space quadrant 1, 3, the signals of radiations 1 and 3 are better audible than the others and thus the Morse signal resulting from the cooperation of segments 1 and 3 and shown in Figure 2 in the quadrant 1, 3, is particularly loud. In like manner the other quadrants 1, 4, or 2, 4 or 2, 3 respectively are characterized by a particularly sharp penetration of the Morse signals resulting from the cooperation of the respective segments and indicated in Figure 2 in these quadrants. In this manner the pilot can recognize in whatever quadrant he resides. If however he travels upon the directing line G, the indications of the signals of all four radiations are received at equal strength, so that in this case an uninterrupted row of signals is produced as shown in Figure 2b and resulting from the cooperation of all rows of the segments of the switch drum.

In Figure 2c, S denotes the rotating switch drum in which the conducting segments are indicated in black. The switch drum is provided with wiping brushes $B_1$, $B_2$, $B_3$ and $B_4$ which are included in the circuits of the antennas $A_1$, $A_2$, $A_3$ and $A_4$, respectively, the said antenna circuits being coupled with the transmitter by means of transformers $K_1$, $K_2$, $K_3$ and $K_4$.

If modulation serves as indication for the single radiation sectors, an optical indication method may be used with advantage, and in which the energies corresponding to the different modulations and appearing at the receiver out-put, are separated and supplied to different lamps which are so arranged in a circle, that they represent the spacial distribution of the different radiation sectors so that equal brightness of the lamps indicate that the aircraft is upon the directing line while at unequal brightness the lamp most illuminated indicates the radiation beam transmitted to the receiving antenna at greatest intensity. This optical indication method will later be more elaborately explained in connection with another embodiment in which different sector radiations are produced by deviating a radiation beam.

It is not absolutely necessary to produce the different radiation sectors by a corresponding number of independent radiations fixedly oriented in space and filling these sectors. It is possible to produce the different radiation sectors by correspondingly deviating one and the same radiation beam into various positions and to provide different modes of indication corresponding with each position of the sector for instance by means of different modulation. It may be assumed that in Figure 3 the plane of drawing is perpendicular to the directing line G so that the latter is projected into the drawing at point G. A very sharply limited beam whose lateral limiting surface forms at its intersection with the drawing plane a limiting line $k$, is so deflected that its central axis $h$ moves around the directing line G in the enveloping surface of a cone $m$, the intersection of which with the drawing plane is represented by the circle $m$. This movement can be continuous so that the axis $h$ of the beam passes about the enveloping surface $m$ at uniform rotation. However, this movement may also be performed in steps so that during each rotation it ceases in succession during a certain short time for a finite number of positions.

The manner in which the deviations of the radiating beam is obtained, is immaterial. This depends essentially upon the manner in which the radiating beam is produced. If it is produced by means of a parabolic reflector the desired movement of the beam can be accomplished by mechanical means, for instance, by correspondingly turning the reflector. In case of sufficiently small dimensions of the radiator and large dimensions of the reflector the former need not be disposed with absolute accuracy in the focal point but may be arranged in the proximity thereof, and in case of a fixed reflector it may move about the focal point preferably so that the plane of polarization does not change.

If as is indicated in Figure 4, the radiating beam is produced by a number of small di-poles $t$, fed from suitable points of the Lecher in-put leads $l$, such arrangement permits of deviating of the radiating beam by electrical means, for instance in connecting some of the di-poles according to a definite sequence by means of a suitable switching device, thus influencing the directional axis of the radiating beam. In this case the plane of polarization remains constant.

According to the following explanation it is assumed that 4 space sectors are used to which correspond different modulations of the radiating beam. Obviously this number could also be greater. It is thus assumed that as long as the axis $h$ of the radiating beam remains upon the part of the convex surface $m$ which extends through the space quadrant L, the radiation will be modulated by the frequency $n_1$ and that in like manner the modulating frequencies $n_o$, $n_r$, and $n_u$ correspond to the space quadrants O, R, U. For the sake of simplicity this explanation is furthermore based upon the condition that the axis $h$ of the radiating beam rotates steadily and uniformly upon the convex surface $m$. Furthermore, in case of the optical indicator the arrangement at the receiving side is adapted in such manner that the lamps $l$, $o$, $r$ and $u$ (see Fig. 3a) are fed by the energies separated from each other at the receiver out-put and which correspond to the modulations $n_1$, $n_o$, $n_r$, and $n_u$ respectively, and that these lamps are so oriented about the center point $g$ of the annular surface in which they are arranged, as the corresponding space quadrants, L, O, R and U about the directing line G.

If the aircraft happens to be in a point F within the left space quadrant and approximately in the proximity of the center of the angle of the quadrant, the lamp $l$ will be fed by the energy for such length of time as modulation of the radiating beam $n_1$ takes place, i. e., during the duration of the movement of the beam axis $h$ within quadrant L from the limiting position $1$ to the limiting position $2$, in other words during the fourth part of the entire period of rotation.

Lamp $o$ will be supplied with energy only during the time in which the axis $h$ of the radiating beam passes through those points of the circuit $m$ within the quadrant O, whose distance from F is smaller than the radius of circuit $k$.

Lamp $u$ for the indicated position F of the aircraft, receives its energy corresponding to modulation $n_u$ during a still shorter period of time than lamp $o$.

Lamp $r$ is not supplied with energy at all.

Hence in the indicated position of the aircraft, lamp $l$ has the greatest brightness, lamp $o$ is lighted darker and lamp $u$ still darker.

The flickering of the lamps can be avoided through suitable heat inertia of the filaments and through a sufficiently rapid speed of rotation of the radiating beam.

If the aircraft resides upon the center line of the angle of the quadrant L, lamps $o$ and $u$ are equally bright but darker than lamp $l$. If point F moves approximately upon line GT, lamp $l$ has the greatest brightness at the passing through circle $m$ and loses light at increasing distance from this circle until it becomes entirely dark in the proximity of point T at the limit of the beam. The lamps $o$ and $u$ extinguish still earlier. Upon the limiting lines between the two quadrants, for instance between L and O, lamps $l$ and $o$ are of equal brightness, the other two are either darker or are not lighted at all, depending upon the distance of the aircraft from the directing line G. When the aircraft approaches the directing line G so that it finally takes its place within the circle $q$ described about point G and touching circle $k$, all four lamps however are in general not lighted at equal illuminating power but are only of equal brightness if the airplane is just upon the directing line G.

In order to facilitate observation of the lamp indicator by the pilot the lamps may be covered by an annular screen of frosted glass whose degree of illumination changes relatively in a uniform manner from place to place (the uniformity can be further increased by increasing the number of sectors, the corresponding modulating frequencies and the indicator lamps). The direction between the center point $g$ of the optical indicator and the most illuminated spot of the frosted glass plate indicates the spacial direction in which the position of the airplane deviates from the directing line G, so that the opposite direction between the most illuminated spot of the frosted glass plate to its center point $g$ is an indication for the pilot guiding him in approaching the directing line.

By this arrangement the pilot's attention is completely alleviated. The only point he has to keep in mind is the rule to "fly from the most illuminated spot towards the center point." Since the slogan "Towards the brightest spot" is yet to be preferred as being still more impressive to the memory, it is advisable to adapt the optical indicator to this rule in that all lamps are turned around the center point $g$ at 180° within the plane of their circle.

Various wave lengths can be employed in the described wire system. In order to obtain a particularly sharp concentration, ultra-short waves, in particular decimeter waves, are preferable at any case.

We claim:

1. A system for directing aircraft, having means including a pair of antennae for directing two beams of radiation in a vertical plane, two other antennae adapted to emit energy each in a directed beam the axis of which lies in an inclined plane perpendicular to said vertical plane, and means for so modulating the energy radiated by the respective antennae that digression of an aircraft-mounted receiver from the line of intersection of the two said planes is denoted by an increased intensity of reception of the modulation which is directed toward the particular sector in which the aircraft flies.

2. In a system of the class described, a directional beam transmitter having means for causing the axis of a directed beam to describe a path substantially conformed to a conical surface, means for impressing upon said beam modulations which are differently characterized as the beam axis describes each of a plurality of arcs of the conical surface, and means including a receiving device mounted on an aircraft for detecting the intensity of the received energy and for denoting the particular conical sector in which the airplane flies when it deviates from the axis of said conical surface.

3. A system in accordance with claim 2 and having means including illuminable indicators arranged in a circle and means responsive to the received modulations for causing one of said indicators to be lighted at a greater intensity than the others for indicating the direction of deviation of the aircraft from the conical axis.

4. In a radio beacon for defining a course to be followed by an airplane, a radio transmitter including means for directing radiations in different paths whose axes lie along the imaginary surface of a cone, said transmitter being at the apex of said cone and the conical axis being substantially coincident with said course, means for differentially characterizing the radiations along different sectors of said conical surface, and means carried aboard the airplane for detecting the characteristics of said radiations and for indicating specifically the vertical or lateral divergence of said airplane from said course.

AUGUST LEIB.
HANS SCHARLAU.